(12) United States Patent
Fukasawa

(10) Patent No.: US 7,625,142 B2
(45) Date of Patent: Dec. 1, 2009

(54) LIGHT QUANTITY ADJUSTING DEVICE

(75) Inventor: Yoshimi Fukasawa, Koufu (JP)

(73) Assignee: Nisca Corporation, Minamikoma-Gun, Yamanashi (JP)

( * ) Notice: Subject to any disclaimer, the term of this patent is extended or adjusted under 35 U.S.C. 154(b) by 375 days.

(21) Appl. No.: 11/723,243

(22) Filed: Mar. 19, 2007

(65) Prior Publication Data
US 2007/0297791 A1   Dec. 27, 2007

(30) Foreign Application Priority Data
Jun. 26, 2006   (JP) .............................. 2006-174803

(51) Int. Cl.
  *G03B 9/02* (2006.01)
(52) U.S. Cl. ........................ 396/506; 396/452; 396/463
(58) Field of Classification Search ................ 396/352, 396/355, 452–456, 463, 467–469, 506, 508
See application file for complete search history.

(56) References Cited

U.S. PATENT DOCUMENTS

| | | | |
|---|---|---|---|
| 4,881,093 A * | 11/1989 | Dowe | 396/463 |
| 5,262,812 A * | 11/1993 | Fukasawa | 396/455 |
| 5,689,746 A * | 11/1997 | Akada et al. | 396/508 |
| 6,806,985 B1 * | 10/2004 | Devenyi | 359/230 |
| 6,866,431 B2 * | 3/2005 | Namazue et al. | 396/450 |
| 7,513,702 B2 * | 4/2009 | Viglione et al. | 396/463 |
| 2004/0258405 A1 * | 12/2004 | Shiratori et al. | 396/458 |
| 2005/0152691 A1 * | 7/2005 | Kawauchi et al. | 396/463 |

FOREIGN PATENT DOCUMENTS

| | | |
|---|---|---|
| JP | 2003-43552 | 2/2003 |
| JP | 2004-138939 | 5/2004 |
| JP | 2006-154211 | 6/2006 |

* cited by examiner

*Primary Examiner*—Melissa J Koval
*Assistant Examiner*—Warren K Fenwick
(74) *Attorney, Agent, or Firm*—Manabu Kanesaka

(57) ABSTRACT

A light quantity adjusting device includes a substrate having an optical path aperture, a blade located on the substrate to adjust the quantity of light passing through the optical path aperture, and an electromagnetic driver that drivingly opens and closes the blade. The electromagnetic driver includes a rotor shaft, an exciting coil, and a frame that rotatably bears the rotor shaft. The rotor shaft includes a pointed first shaft end and a cylindrical second shaft end. The frame has a conical bearing recess that supports the first shaft end and a cylindrical bearing hole that supports the second shaft end. The electromagnetic driver is located so that the first shaft end of the rotor shaft is closer to the substrate than the second shaft end. An arm is coupled to the first shaft end of the rotor shaft to transmit an opening and closing driving force to the blade.

5 Claims, 13 Drawing Sheets

Fig. 5(c)
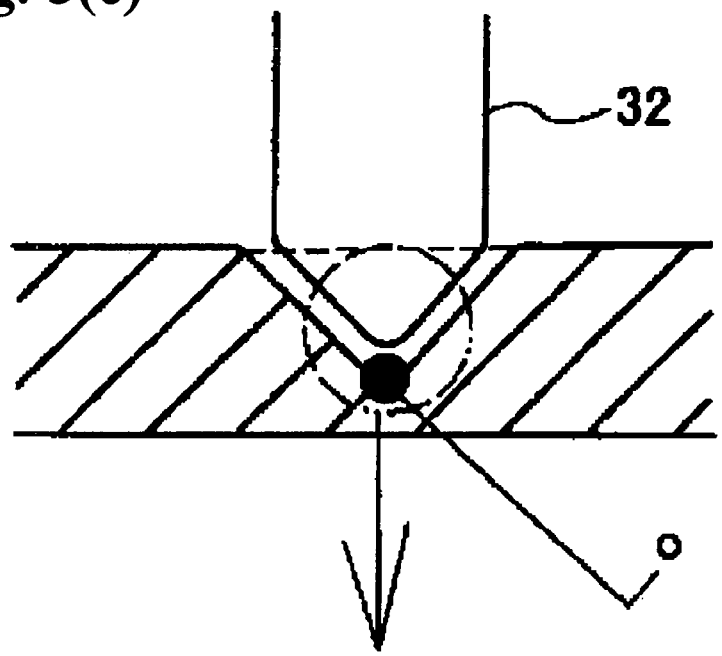
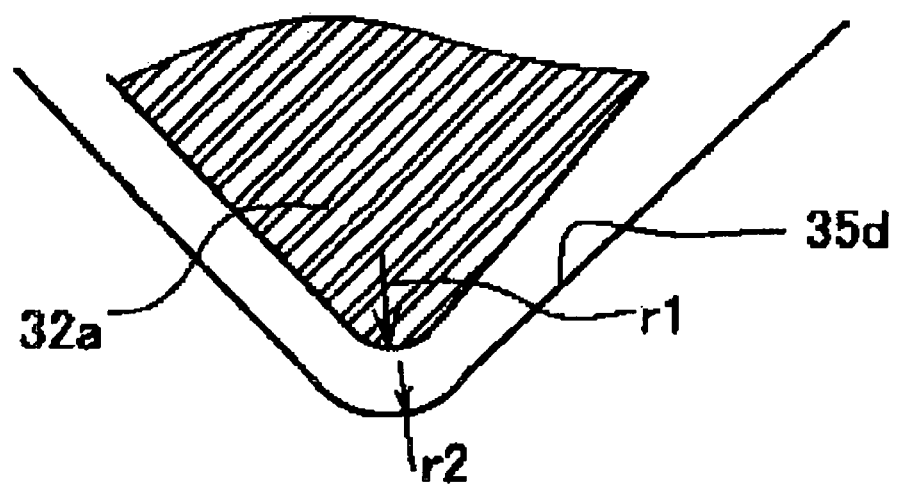

Fig. 5(d)
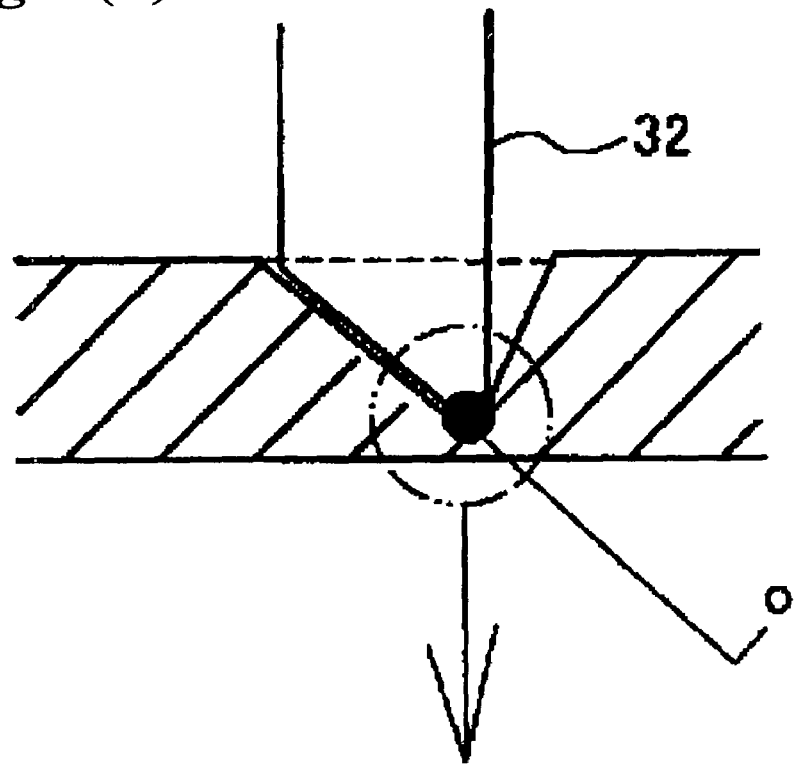
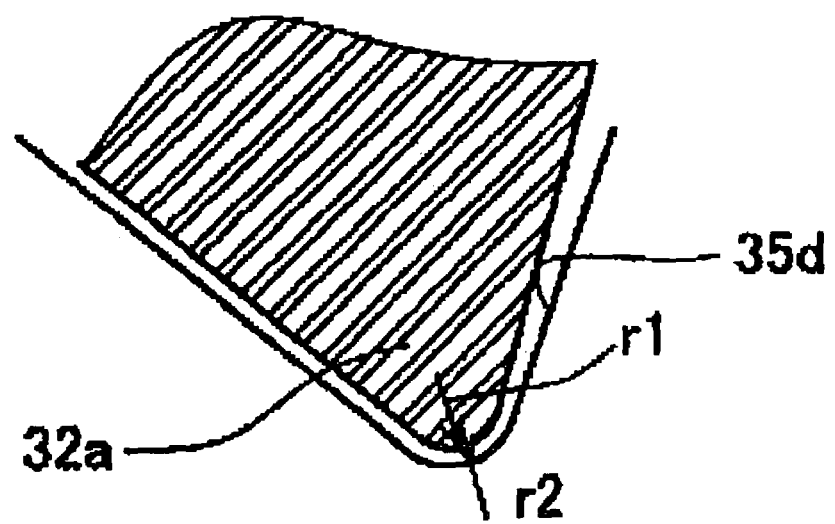

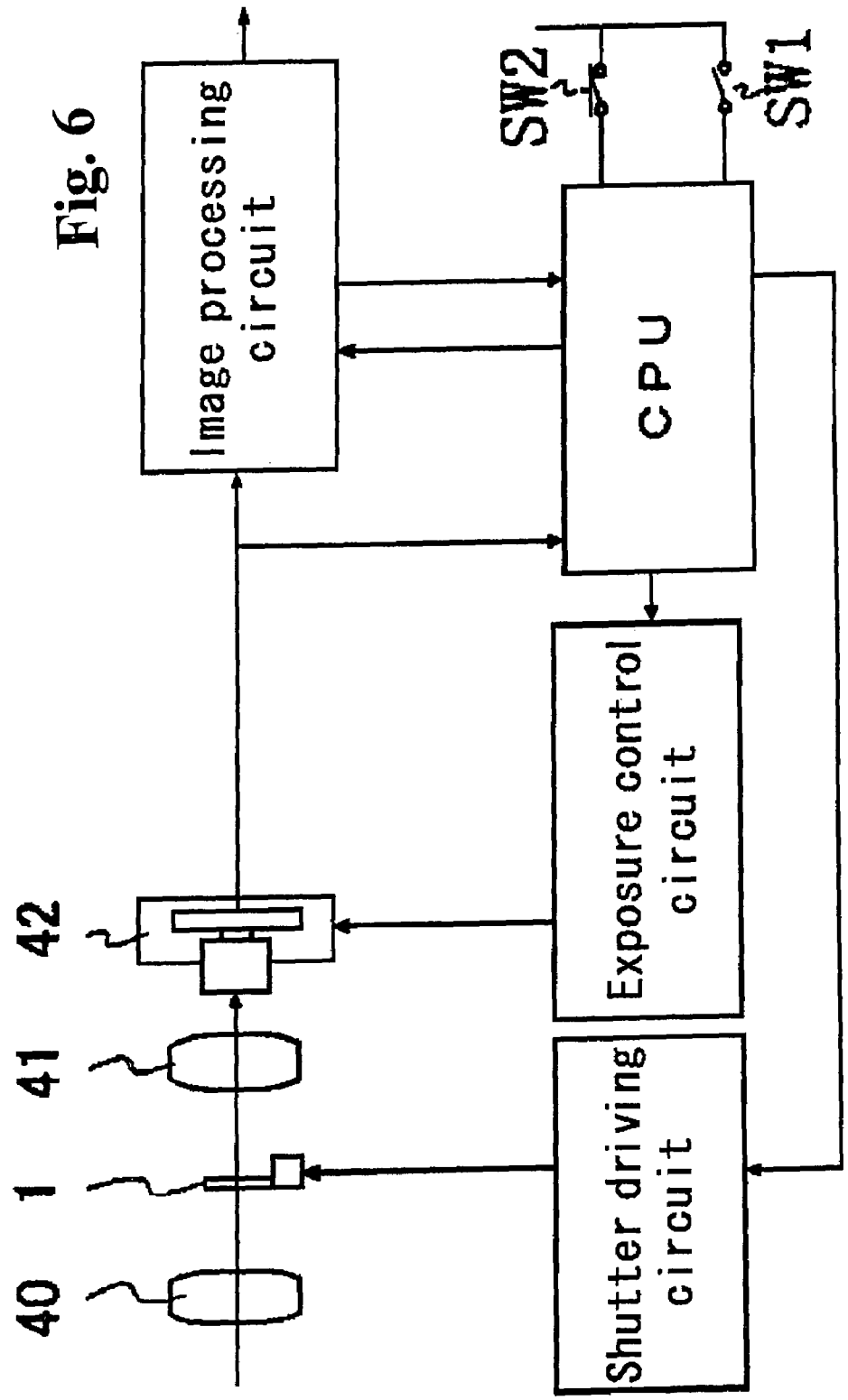

LIGHT QUANTITY ADJUSTING DEVICE

BACKGROUND OF THE INVENTION AND RELATED ART STATEMENT

The present invention relates to light quantity adjusting devices provided in still cameras, video cameras, or other image pickup apparatus that open and close blades, such as shutter blades or diaphragm blades, to adjust the quantity of photographing light.

In general, these light quantity adjusting devices adjust the quantity of light for use by a shutter or a diaphragm by operation of an electromagnetic driver to open and close a blade located on a photographing optical axis of a camera or the like. The electromagnetic driver is composed of a magnet rotor having a permanent magnet and a rotating shaft provided in the center of the permanent magnet, and a stator having a coil frame and an exciting coil wound around the outer periphery of the coil frame. The electromagnetic driver energizes the exciting coil to rotate the magnet rotor by a predetermined angle to open and close the blade.

There has been a strong demand for a reduction of sizes of these electromagnetic driving light quantity adjusting devices. For example, for cameras incorporated into small-sized instruments such as cellular phones, light quantity adjusting devices such as shutter blades or diaphragm blades are required to have a drastically reduced size and reduced power consumption. In a driving section of the light quantity adjusting device, the rotating shaft of the magnet rotor is rotatably borne by the coil frame, around which the exciting coil is wound and which is externally covered by a sleeve-like yoke. The yoke has had its diameter reduced to about 2 to 3 mm and a further reduction in yoke diameter has been demanded.

A problem in reducing the size of the driving section is how to bear the rotating shaft of the magnetic rotor (hereinafter referred to as a "rotor shaft") by means of a frame such as the coil frame. A bearing structure is known such that the rotating shaft is borne by fitting an end of the cylindrical shaft into a cylindrical bearing hole. In such a bearing structure, for example, an end surface of the magnet rotor is slidably contacted with the frame to support the rotor shaft in the thrust direction in order to prevent the rotor shaft from moving in a thrust direction (axial direction). An outer peripheral wall of the rotor shaft is slidably contacted in a radial direction with an inner wall of the bearing hole. This results in a heavy frictional load on the bearing.

Unfortunately, a reduction in the shaft diameter of the rotor shaft may also lead to frequent jolts of the rotor shaft in the bearing hole. It is difficult to machine the components so as to form an appropriate gap in the fitting portion.

Thus, for example, Japanese Patent Laid-Open No. 2004-138939 proposes the use of a pivot bearing structure that bears the rotor shaft in the coil frame. Specifically, Japanese Patent Laid-Open No. 2004-138939 proposes a bearing structure having a magnet rotor shaft, a coil frame, a coil, and a yoke annually arranged on a rear surface of a substrate in this order, with a blade located on the substrate. In this structure, a lower end of the rotor shaft is formed to be spherical or conical and supported by a conical or spherical bearing hole.

With such a pivot bearing, when the opposite ends of the rotating shaft (rotor shaft) are pointed and supported by V groove bearings, the rotating shaft may jolt up and down unless a space is very accurately formed between V groove bearings, located at the respective ends of the rotating shaft. Thus, according to the Japanese Patent Laid-Open No. 2004-138939, one end of the rotor shaft is pointed and supported by the V groove bearing. The other end is formed to be cylindrical and supported by the cylindrical bearing. The rotor shaft is magnetically urged against the V groove bearing so that loads act on the V groove. This stabilizes the rotor shaft by reducing the load acting on the rotor shaft.

For example, Japanese Patent Laid-Open No. 2004-138939 discloses that a pivot bearing, undergoing relatively light loads in the thrust direction, be employed when the rotor shaft is stably supported with the bearing load reduced as described above. Thus, in the known bearing structure, as shown in FIGS. 8(*a*) and 8(*b*), a coil frame 51 around which a coil is wound is mounted on a substrate 50. A V or U-shaped bearing groove 52 is formed at a lower end of the coil frame 51 to support a pointed shaft end 53*a* formed on a rotor shaft 53. The other end of the rotor shaft 53 is formed into a cylindrical shaft end 53*b*, the outer periphery of which is supported by a cylindrical bearing 54. An arm 55 is integrally attached to a cylindrical shaft end 53*b* supported by the cylindrical bearing 54. The arm 55 is engaged with a blade 56 mounted on the substrate 50.

In the above conventional bearing structure, the rotor shaft 53 is positioned by the illustrated bearing groove 52 and may be tilted around this point (pivot point). This is because a clearance needs to be formed between the cylindrical shaft end 53*b*, located at the upper end of the rotor shaft 53, and the cylindrical bearing 54, which fittingly supports the periphery of the cylindrical shaft end 53*b*, and may vary owing to machining accuracy. That is, the frictional load is increased when the outer diameter d1 of the cylindrical shaft end 53*b* is equal to the inner diameter d2 of the cylindrical bearing 54 (d1=d2). A large dimensional difference between the outer diameter d1 and the inner diameter d2 increases the gap to tilt the rotor shaft 53 as shown in the figure.

Such a clearance is required for smooth rotations, and it is considered to be almost impossible to maintain the machining accuracy necessary for a uniform clearance. For example, when machining is performed so that the rotor shaft has a circularity and an outer diameter accurate to at least $\frac{1}{100}$ mm, costs and the number of failures in a manufacturing process increase. This also applies to machining of the cylindrical bearing.

Then, when the lower end of the rotor shaft is pivotally supported and the arm is provided at the upper end to drivingly open and close the blade, as in the prior art, the following problem may occur. The rotor shaft 53 is tilted (through an illustrated angle α) when a clearance (gap) larger than required is formed between the cylindrical shaft end 53*b* at the upper end of the rotor shaft 53 and the cylindrical bearing 54, which supports the cylindrical shaft end 53*b*. This inclination (angle α) results in a displacement Y in the blade 56, which is thus jolted. The displacement $Y=2Ly \cdot \sin(\beta y/2) \cdot \cos(\alpha+\beta y/2)$. The magnitude of jolt increases in proportion to the length Ly between a pivot point o1 and the engaging point o2, between the arm 55 and the blade 56.

When a jolt occurs between the rotor shaft and the blade, if the blade performs, for example, a shutter operation, then disadvantageously, an optical path aperture cannot be fully closed or opened. Further, if the blade performs a restricting operation, then disadvantageously, the quantity of light cannot be adjusted to a value meeting photographing conditions or hunting may occur during operation to vibrate the blade, which becomes uncontrollable making the apparatus defective.

Thus, an object of the present invention is to provide a light quantity adjusting device that reduces frictional loads on a rotor shaft supported by bearings to allow a blade to be stably driven and to further minimize jolting of the blade.

Another object of the present invention is to provide a simple, inexpensive light quantity adjusting device that has a reduced size and reduced power consumption.

Further objects and advantages of the invention will be apparent from the following description of the invention.

SUMMARY OF THE INVENTION

A configuration described below is employed to accomplish the above objects. A device in accordance with the present invention comprises a substrate including an optical path aperture, a blade located on the substrate to adjust the quantity of light passing through the optical path aperture, and an electromagnetic driver that drivingly opens and closes the blade.

The electromagnetic driver comprises a rotor shaft, an exciting coil that applies a rotating force to the rotor shaft, and a frame that rotatably bears the rotor shaft. In this case, the rotor shaft has a pointed first shaft end and a cylindrical second shaft end at respective ends thereof. The frame has a conical bearing recess that supports the first shaft end and a cylindrical bearing hole that supports the second shaft end.

The electromagnetic driver is located so that the first shaft end of the rotor shaft is closer to the substrate. An arm is coupled to the first shaft end of the rotor shaft to transmit an opening and closing driving force to the blade. This allows the rotor shaft to be positioned and supported by the pointed first shaft end and the conical bearing recess. The above configuration minimizes the possibility that the blade is jolted or hunted when a jolt occurs between the second shaft end, the other end, and the cylindrical bearing hole.

Further, the rotor shaft has urging means for urging the rotor shaft so as to press the first shaft end against the bearing recess. The urging means comprises a magnetic attractive force that acts on the rotor shaft. This enables a stable bearing action to be achieved using the simple structure.

The urging means may comprise a yoke of a soft magnetic material located on an outer periphery of a magnet rotor to exert a magnetic urging force on the rotor shaft. Moreover, the first shaft end is formed as a spherical projecting curved surface, and the bearing recess is formed like a conical recessed curved surface that fits the spherical projecting curved surface. The radius of curvature of the recessed curved surface is set larger than that of the projecting curved surface minimizing the possibility that a dimensional error resulting from molding of the rotor shaft hinders the bearing of the rotor shaft.

The frame comprises a coil frame around which an exciting coil is wound to apply a rotating force to the permanent magnet. The frame has a sleeve-like yoke fitted around an upper half thereof positioned on a rear surface of the substrate and a heat-shrinkable tube fitted around a lower half thereof. The yoke exerts a magnetic attractive force on the rotor shaft to urge the first shaft end toward the bearing recess. A magnetic detecting element is accommodated and supported between the heat-shrinkable tube and the frame to detect magnetism in the rotor shaft.

BRIEF DESCRIPTION OF THE DRAWINGS

FIG. 5(c) is an enlarged view of the device in FIG. 2, in which the pointed end surface showing the sectional shape of the first shaft end is V-shaped;

FIG. 5(d) is an enlarged view of the device in FIG. 2 in which the pointed end surface showing the sectional shape of the first shaft end has a obliquely cut shape;

FIG. 6 is a diagram showing a control arrangement for the light quantity adjusting device in FIG. 1 incorporated into a lens barrel in an image pickup apparatus;

DETAILED DESCRIPTION OF PREFERRED EMBODIMENTS

Figure 1:
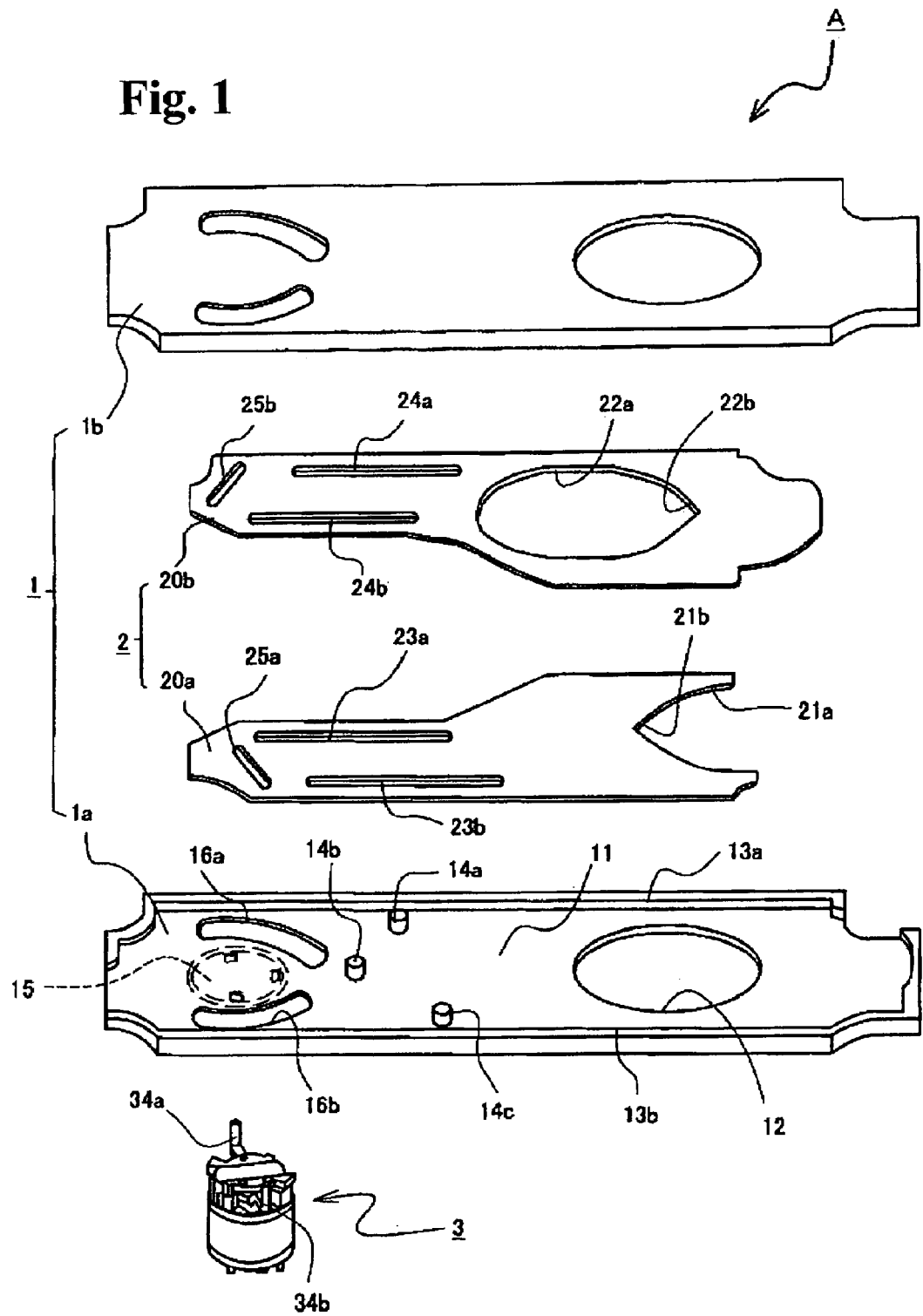
FIG. 1 is an exploded perspective view of a light quantity adjusting device according to the present invention.
Figure 2:
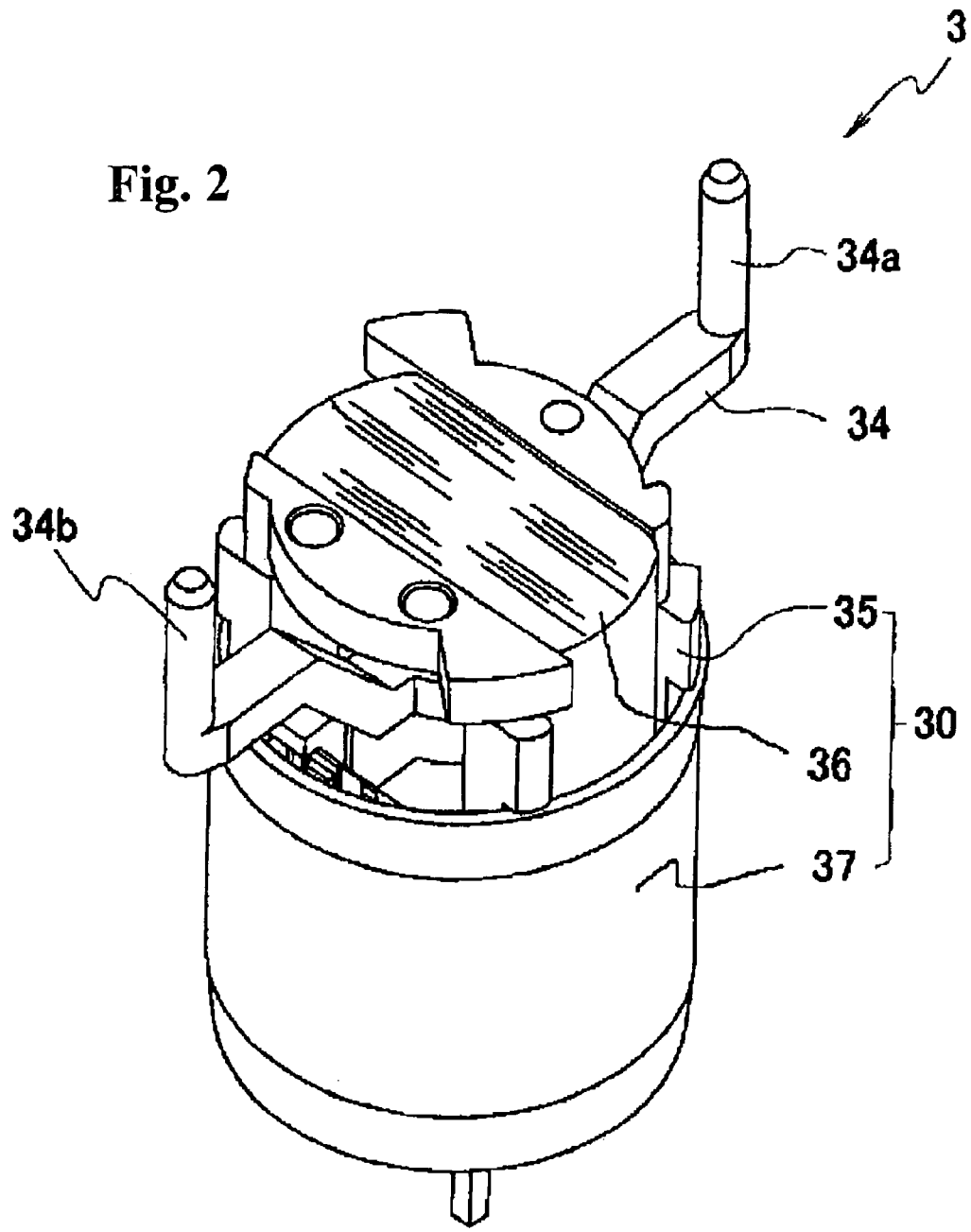
FIG. 2 is a perspective view illustrating a driver in the device in FIG. 1.
Figure 3:
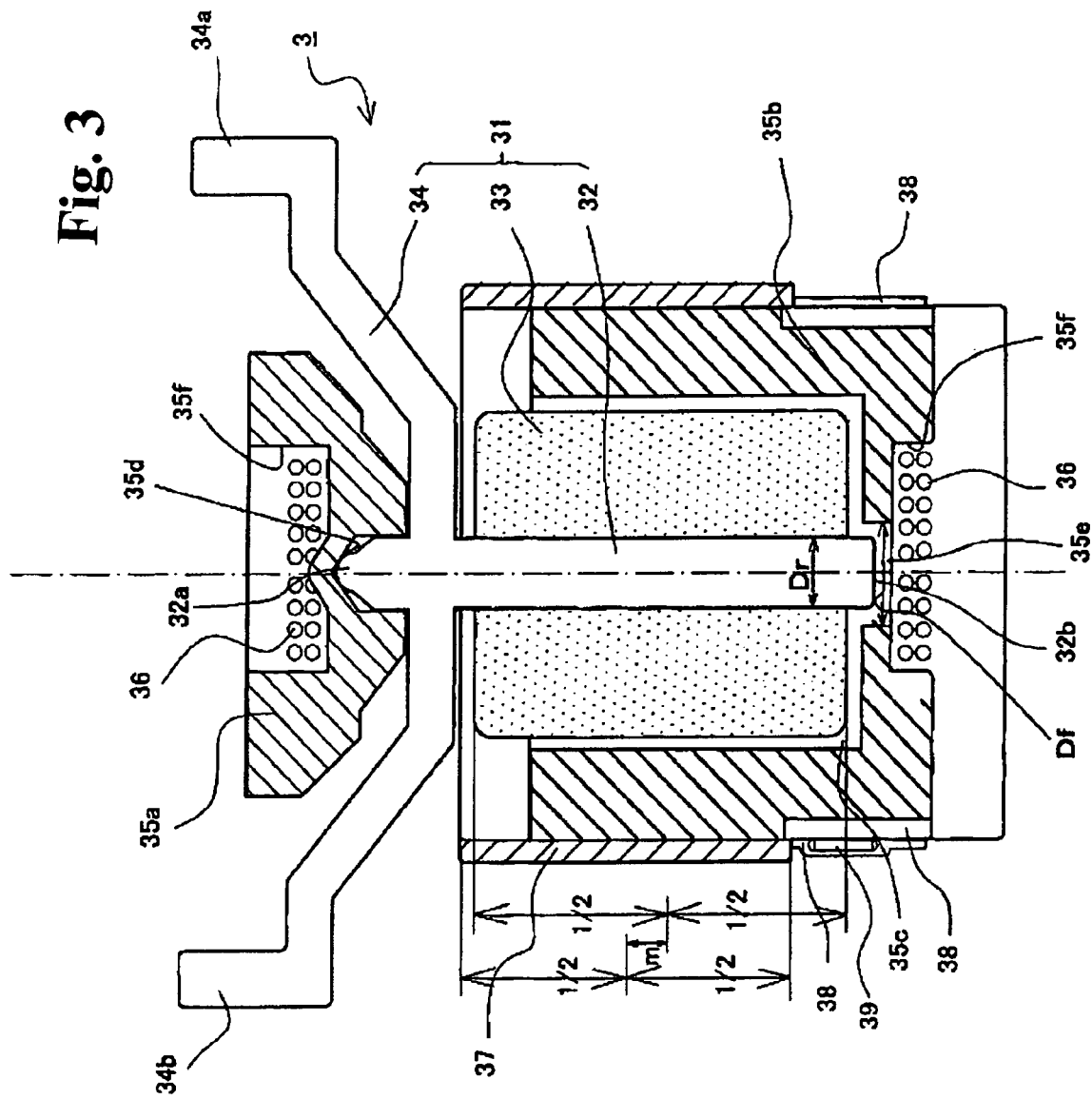
FIG. 3 is a vertical sectional view of the device in FIG. 1.
Figure 4:
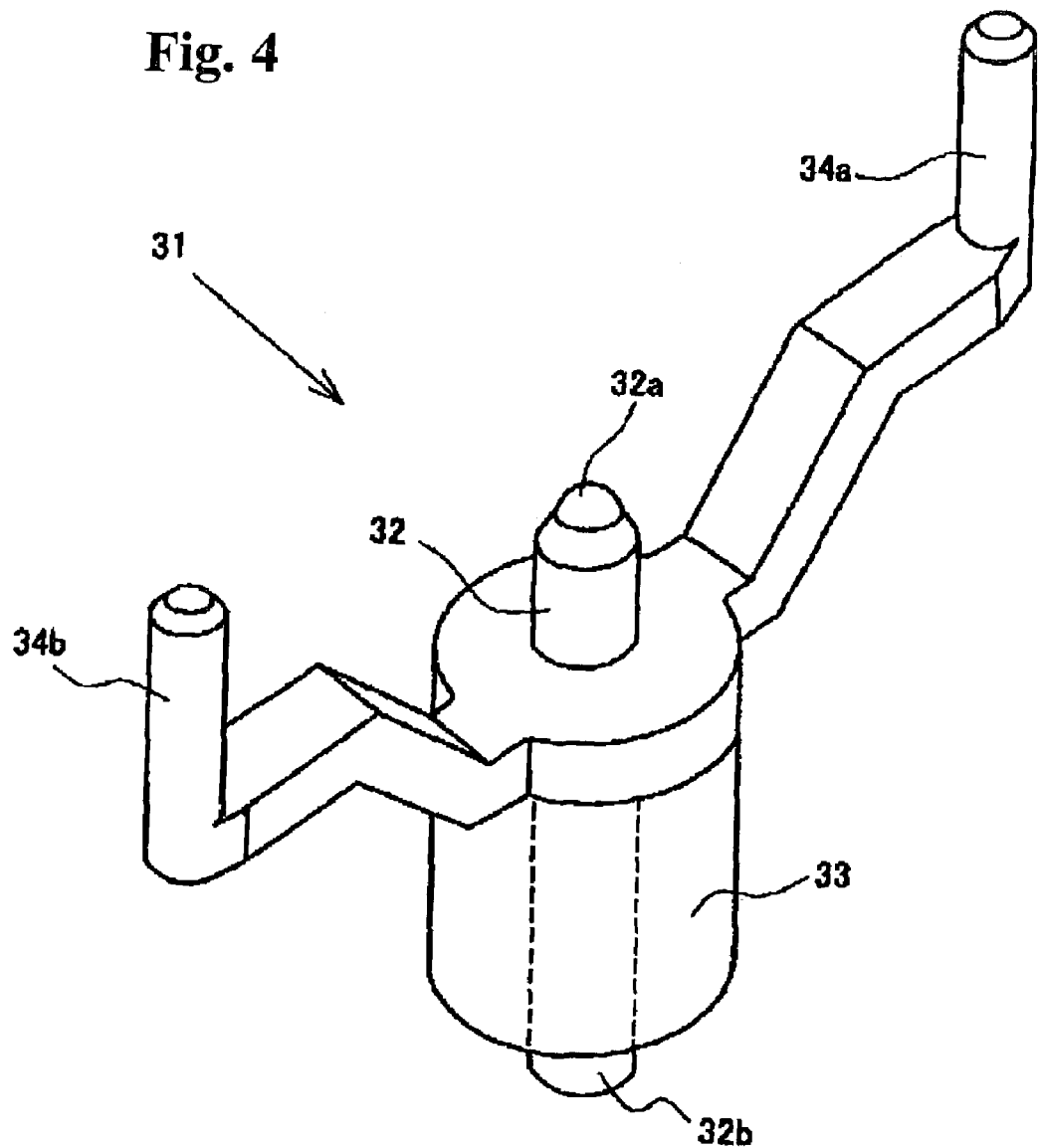
FIG. 4 is a perspective view showing a rotor set in the device in FIG. 2.

The present invention will be described on the basis of an illustrated preferred embodiment. FIG. 1 is an exploded perspective view of a light quantity adjusting device in accordance with the present invention. FIG. 2 is a perspective view of an electromagnetic driver that drivingly opens and closes a blade. FIG. 3 is a vertical sectional view of the electromagnetic driver.

The general configuration of a light quantity adjusting device A will be described with reference to FIG. 1. As shown in FIG. 1, the light quantity adjusting device in accordance with the present invention is composed of a substrate 1, a blade 2, and a driver 3. The substrate 1 is composed of a flat base plate 1a and a retainer plate 1b laid on top of the base plate 1a with a small gap formed between the base plate 1a and the retainer plate 1b. The base plate 1a is shaped to be incorporated in a space in a camera into which a photographing lens barrel is incorporated. The base plate 1a is formed by, for example, molding a synthetic resin with a high heat resistance and a high mechanical strength or pressing a metal plate.

The base plate 1a has a blade supporting surface 11 and an optical path aperture 12 formed in its center and a flange 13 formed around its periphery. A first blade 20a and a second blade 20b are supported on the blade supporting surface 11 so as to lie on top of each other. The first and second blades 20a and 20b lie opposite an optical path aperture 12.

In FIG. 1, each of the first and second blades 20a and 20b is composed of a restricting blade that restricts the optical path aperture 12 to a larger or smaller diameter. The first blade 20a has a semicircular opening 21a with a pointed portion 21b in its center. The second blade 20b has a circular opening 22a with a pointed portion 22b in its center. The openings 21a and 22a in the first and second blades 20a and 20b are located opposite the optical path aperture 12.

Then, the diameter of the optical path aperture 12 is reduced by sliding the first and second blades 20a and 20b closer to each other relative to the optical path aperture 12. In contrast, the diameter of the optical path aperture 12 is increased by sliding the first and second blades 20a and 20b away from each other relative to the optical path aperture 12. This enables the quantity of light to be adjusted in accordance with photographing conditions.

Thus, each of the first and second blades 20a and 20b has its opposite side edges guided and supported by opposite side walls 13a and 13b of the flange 13 of the base plate 1a so as to be slidable in the lateral direction of FIG. 1. Further, the first blade 20a has slit grooves 23a and 23b, and the second blade 20b has similar slit grooves 24a and 24b. Guide pins 14a, 14b, and 14c are provided on the blade supporting surface 11 of the base plate 1a and fitted in the slit grooves 23a, 23b, 24a, and 24b.

The illustrated guide pin 14a is fitted in the slit groove 24a. The pin 14b is fitted in the slit groves 23a and 24b. The pin 14c is fitted in the slit groove 23b. Consequently, the first and second blades 20a and 20b are guided by the opposite side walls 13a and 13b of the flange 13 and the guide pins 14a, 14b, and 14c to move linearly in the lateral direction of FIG. 1. Cam grooves 25a and 25b are formed in the blades 20a and 20b, respectively, in a direction crossing a sliding direction at a predetermined angle. A driving arm 34 of the driver 3, described below, engages with the cam grooves 25a and 25b.

The ground plate 1a has the blade 2 installed on its front surface and a mounting portion 15 for the driver 3 provided on its rear surface. The driver 3, described below, is mounted on the mounting portion 15. The driver 3 is composed of a rotor set 31 and a stator set 30, and the rotor set 31 is composed of a rotor shaft 32, a permanent magnet 33, and a driving arm 34. In the illustrated rotor set 31, the rotor shaft (hereinafter referred to as the "rotating shaft") 32 is integrally fixed to the center of cylindrical permanent magnet 33. The driving arm 34 is integrally fixed to the rotating shaft 32. The permanent magnet 33 is made of a ferrite magnet, a neodymium magnet, or the like sintered into a cylinder with a shaft hole in its center. The rotating shaft 32, formed of metal or resin, is penetratingly inserted into the central shaft hole for integration.

The permanent magnet 33 may be molded of a polymer material such as magnetic polymer. In this case, the polymer material is molded integrally with the rotating shaft 32. After the rotating shaft 32 is penetratingly inserted into the polymer material, the rotating shaft 32 and the polymer material are integrated together with an adhesive and magnetized to obtain a cylindrical magnet (ferromagnetic substance). The magnetizing direction is such that the outer periphery of the cylindrical magnet is magnetized polarizingly so as to obtain two, four, or an appropriate number of poles.

The rotating shaft 32 is formed, by molding, to have a pointed upper shaft end 32a (hereinafter referred to as a "first shaft end") and a cylindrical lower shaft end 32b (hereinafter referred to as a "second shaft end"). The shapes of the first and second shaft ends will be described below.

The integrated permanent magnet 33 and rotating shaft 32 formed above are further integrated with a driving arm 34. The illustrated driving arm 34 is integrated with the rotating shaft 32 and composed of a first arm 34a and a second arm 34b extending in the radial direction of the rotating shaft 32, to transmit rotation of the rotating shaft 32 to the blade 2. The driving arm 34 may be molded of resin or the like integrally with the rotating shaft 32 or separately molded and secured to the rotating shaft with an adhesive or the like as shown in FIG. 1. In this case, with the rotating shaft with a reduced diameter (smaller diameter), reliable integration can be achieved by capping both an end surface of the permanent magnet and the rotating shaft before bonding them together.

In the driving arm 34, the first and second arms 34a and 34b are located opposite each other across the rotating shaft 32. This is because the blade 2 is formed of two blades, a first blade and a second blade which are slid in the opposite directions. However, if the driving arm 34 comprises a transmission ring coupled to one or more blades, it may be composed of one arm coupled to the blade or the transmission ring.

The rotor set 31 is pivotally contained in the stator set 30, described below. The stator set 30 is composed of a coil frame 35, an exciting coil 36 wound around the coil frame, and a yoke 37 serving as a housing shield. The coil frame 35 is shaped like a cylinder divided into two in the lateral or vertical direction of FIG. 3 so that the rotor set 31 can be contained in the coil frame 35. The coil frame 35 is normally formed of a synthetic resin and is divided into two pieces like cups in the vertical direction or into two pieces in the lateral direction around the rotating shaft 32. In FIG. 1, the coil frame 35 is divided into two pieces in the vertical direction: an upper coil frame 35a and a lower coil frame 35b. When merged together, the upper and lower coil frames 35a and 35b comprise a cavity 35c in which the permanent magnet 33 is accommodated, along with bearings 35d and 35e that bear the first and second shaft ends 32a and 32b of the rotating shaft 32, and a coil winding groove 35f around the outer periphery of which an exciting coil is wound.

Figure 5A:
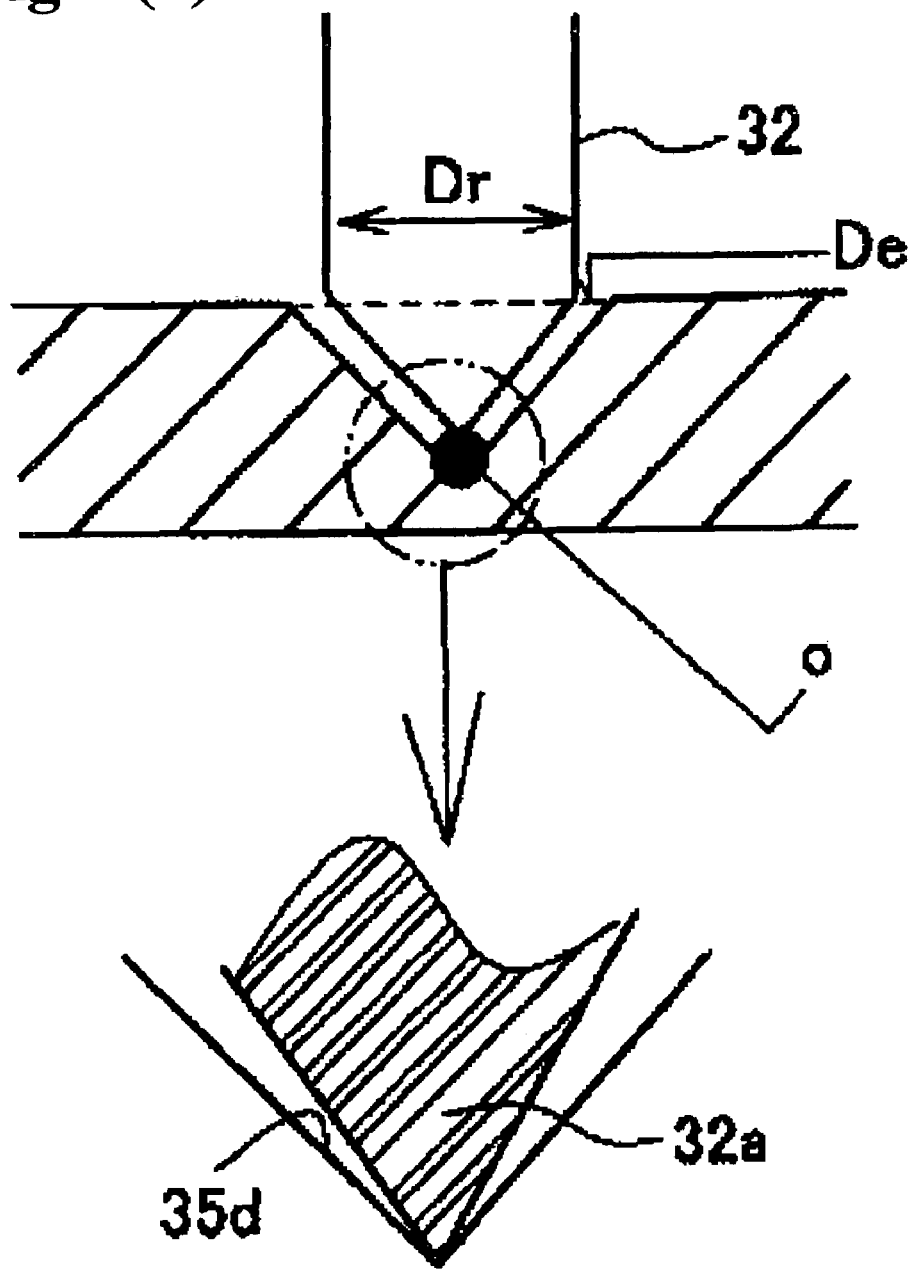
FIG. 5(a) is an enlarged view of the device in FIG. 2, in which a pointed end surface showing the sectional shape of a first shaft end is shaped like an isosceles triangle.

The first shaft end 32a is pointed, and the upper coil frame 35a has a conical bearing recess 35d that fits the pointed first shaft end 32a. The shapes of the first shaft end 32a and the bearing recess 35d will be described. Both the first shaft end 32a and the bearing recess 35d may be shaped generally like isosceles triangles, as shown in FIG. 5(a). However, this may pose a durability problem, that is, the shaft end 32a may be worn away. Another problem is that the first shaft end 32a may stick into the bearing recess 35d, depending on their materials. This arrangement is thus unsuitable for the light quantity adjusting device.

Figure 5B:
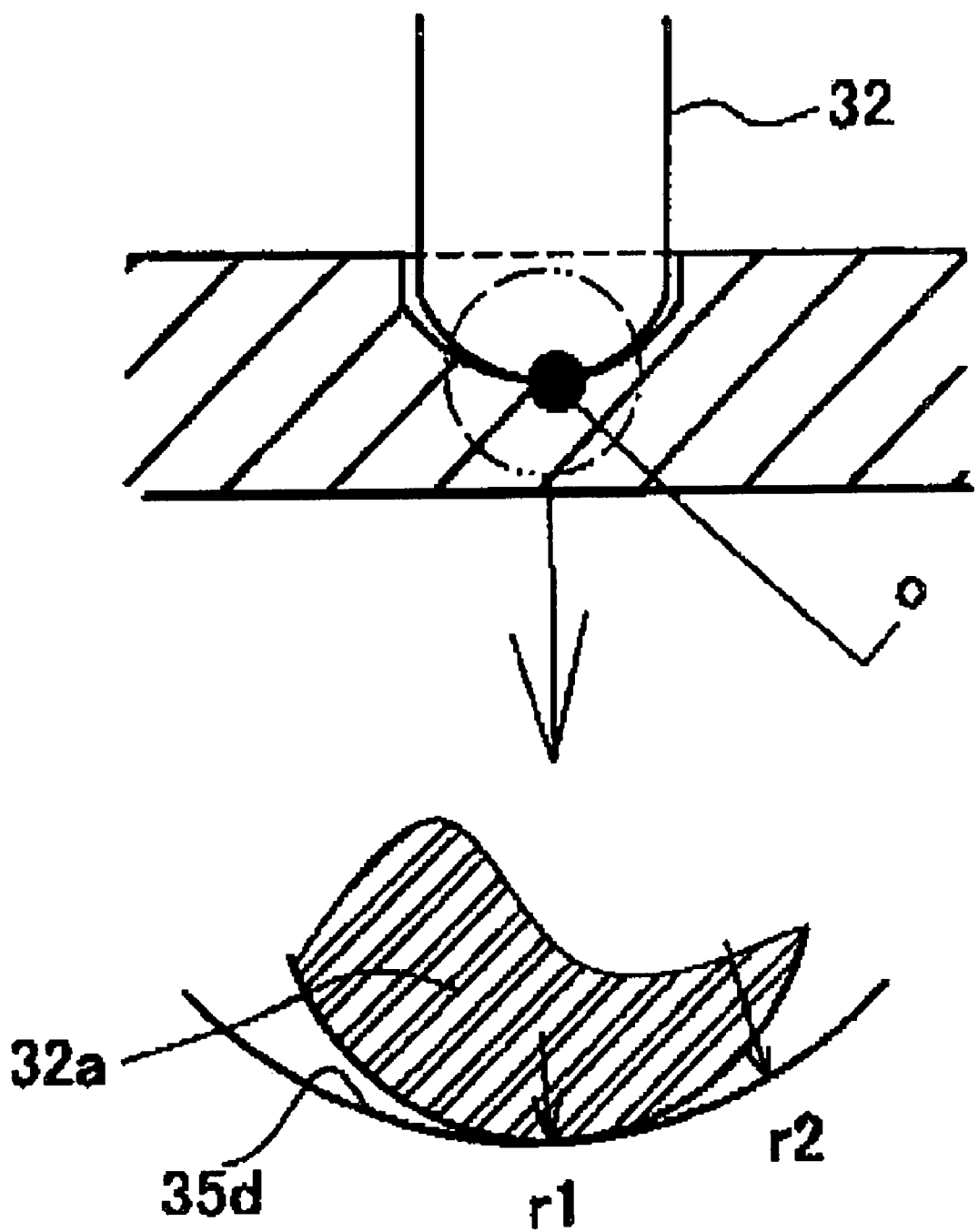
FIG. 5(b) is an enlarged view of the device in FIG. 2, in which the pointed end surface showing the sectional shape of the first shaft end is U-shaped.

In the device in FIG. 2, as shown in FIG. 5(b), the tip of the first shaft end 32a is formed to have a U-shaped cross section with a radius of curvature r1. The bearing recess 35d is also formed to have a U-shaped cross section with a radius of curvature r2. The shaft end 32a and the bearing recess 35d may be formed to have a V-shaped cross section as shown in FIG. 5(c) or may be obliquely cut as shown in FIG. 5(d). In either case, the tip of the shaft end is formed like a circular arc with the radius of curvature r1. Furthermore, the recessed part of the bearing recess 35d is shaped like a circular arc with the radius of curvature r2. The radius of curvature r1 is set smaller than the radius of curvature r2, such that r1<r2. This shaft supporting structure minimizes the possibility of varying the position of a contact o shown in FIGS. 5(b) to 5(d) even with a machining accuracy error in the shaft diameter Dr of the rotating shaft 32 or a machining accuracy error in the inner diameter De of the bearing recess 35d.

On the other hand, the second shaft end 32b is supported by cylindrical bearing hole 35e, formed in the lower coil frame 35b. In this bearing structure, the outer periphery of the cylindrical second shaft end 32b is fittingly supported by the bearing hole 35e. Accordingly, the shaft diameter Dr of the rotating shaft 32 and the inner diameter Df of the bearing hole 35e needs to be set so as to ensure smooth rotating motion and to prevent the rotating shaft 32 from jolting. The shaft diameter Dr, approximating the inner diameter Df, reduces the magnitude of jolt but increases a frictional load, requiring a strong rotational driving force. In contrast, a larger gap (Dr<<Df) reduces the frictional load but may cause the rotating shaft 32 to be tilted by jolting. Thus, in connection with the support of the rotating shaft 32, jolts in the shaft supports at the respective shaft ends deflect the rotating shaft to prevent smooth motion.

Thus, according to the present invention, a pivot-like shaft supporting structure is used for the first shaft end 32*a*, and the second shaft 32*b* is supported by an ordinary cylindrical bearing hole. As described above, the upper coil frame 35*a* and the lower coil frame 35*b* rotatably support the rotating shaft 32, that includes the permanent magnet 33. The exciting coil 36 is wound around the outer periphery of the upper and lower coil frames 35*a* and 35*b* at the coil winding groove 35*f* to integrate the upper and lower coil frames 35*a* and 35*b* together. The yoke 37 is fitted around the coil frame 35, around the outer periphery of which the exciting coil 36 is wound. The yoke 37 is made of a soft magnetic material such as iron to magnetically shield the permanent magnet 33 of the rotor set 31.

Thus, the yoke 37 is located around the outer periphery of the coil frame 35 so as to cover the internal permanent magnet 33. The yoke 37 further has its axial center biased toward the first shaft end 32*a* by a distance m (FIG. 3) with respect to the axial center of the permanent magnet 33 so as to always urge the rotating shaft 32 upward in FIG. 3, that is, to always urge the first shaft end 32*a* toward the bearing recess 35*d*. This structure magnetically urges the rotating shaft 32 upward in FIG. 3 to hold the first shaft end 32*a* so that it abuts against the bearing recess 35*d*.

A heat-shrinkable tube 38 is fitted around a lower end of the coil frame 35 to protectively cover the lower coil frame 35*b* and the exciting coil 36, wound around the lower coil frame 35*b*. Reference numeral 39 in the figure denotes a magnetism detecting element (Hall element) that detects the rotating position of the permanent magnet 33 (the rotating position of the rotor shaft). In particular FIG. 3 illustrates a heat-shrinkable resin tube that is fittingly inserted into the coil frame 35 via the magnetism detecting element 39 and then heated to fix the detecting element 39 to the coil frame 35.

The driver 3 configured as a unit as described above is installed on the driver mounting portion 15 of the base plate 1*a*. One of the upper coil frame 35*a* and lower coil frame 35*b* of the coil frame 35 has a mounting stem that is fixed to the mounting portion 15 on the rear surface of the base plate 1*a*. Screws or the like may be used for the fixture, but an assembly operation is facilitated by fitting an elastic pawl provided at a stem edge into a mounting hole (not shown) in the base plate 1*a*. In this mounting operation, the first and second arms 34*a* and 34*b* of the rotating shaft 32 are penetratingly inserted into clearance grooves 16*a* and 16*b* formed in the base plate 1*a* to engage with the cam grooves 25*a* and 25*b*, formed in the blade 2.

A retainer plate 1*b* is mounted on the flange 13 formed on the base plate 1*a*. The retainer plate 1*b* is formed by pressing a metal plate so as to have substantially the same shape as that of the base plate 1*a*. The retainer plate 1*b* is laid on top of the flange 13 and fixed by the elastic pawl, formed on the base plate 1*a*.

The light quantity adjusting device A configured as described above is incorporated into, for example, an image pickup apparatus shown in FIG. 6, to adjust the quantity of light passing through the optical path aperture 12. The light quantity adjusting device A, described above, is incorporated into a lens barrel in a steel camera, a video camera, or the like. Reference numeral 40 in FIG. 6 denotes a front lens located on a photographing optical path. Reference numeral 41 denotes a rear lens located on the photographing optical path. These lenses form a subject image, and image pickup means 42 is located on an image forming surface. The image pickup means 42 comprises a solid image pickup element such as a CCD, or a photosensitive film. Control is performed by a CPU control circuit, an exposure control circuit, and a shutter driving circuit. Reference character SW1 in the figure denotes a main power supply switch. Reference character SW2 denotes a shutter release switch. An auto focus circuit or the like is also used to control the camera, but because such a control arrangement is well known, its description is omitted.

The substrate 1 is interposed between the front lens 40 and the rear lens 41, which are incorporated into the lens barrel. The first and second blades 20*a* and 20*b* and driver 3, incorporated into the light quantity adjusting device A, are arranged on the substrate 1 as a unit. A control CPU sets photographing conditions such as exposure and shutter speed and issues instruction signals to the exposure control circuit and shutter driving circuit. For the exposure, the exposure control circuit supplies a current of a predetermined direction to the coil in the driver 3 in response to an instruction signal from the control CPU. Then, rotation of the driver 3 is transmitted to the first and second blades 20*a* and 20*b* via the driving arms 34*a* and 34*b* to form the optical path aperture 12 so as to obtain the optimum exposure.

According to the present invention, to pivotally support the rotating shaft (rotor shaft) 32 in the frame (coil frame) 35 during the adjustment of the light quantity, the shaft end (first shaft end 32*a*) of the rotating shaft 32, located close to the base plate 1*a*, is pointed and borne by the conical bearing recess 35*d* in the coil frame 35. The shaft end (second shaft end 32*b*), located away from the base plate 1*a*, is cylindrical formed and borne by the cylindrical bearing hole 35*e* in the coil frame 35. Consequently, the present invention operates as described below even with a variation in shaft diameter caused by the inappropriate machining dimensional accuracy of the rotating shaft 32 and coil frame 35.

Figure 7A:
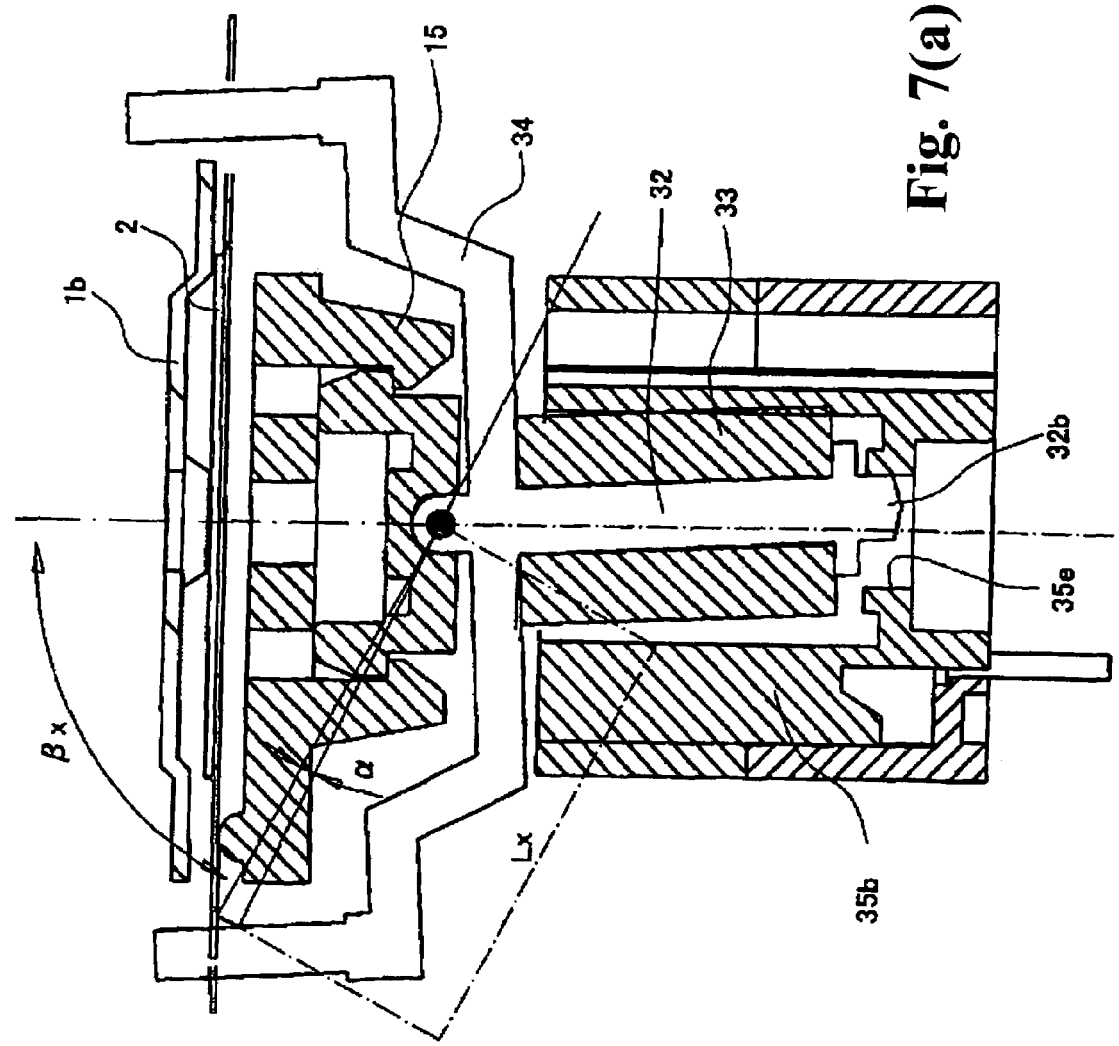
FIG. 7(a) is a diagram illustrating the degree of displacement of a blade resulting from a change in the shaft diameter of the rotor shaft in the device in FIG. 2, the rotor shaft being inclined at a predetermined angle.
Figure 7B:
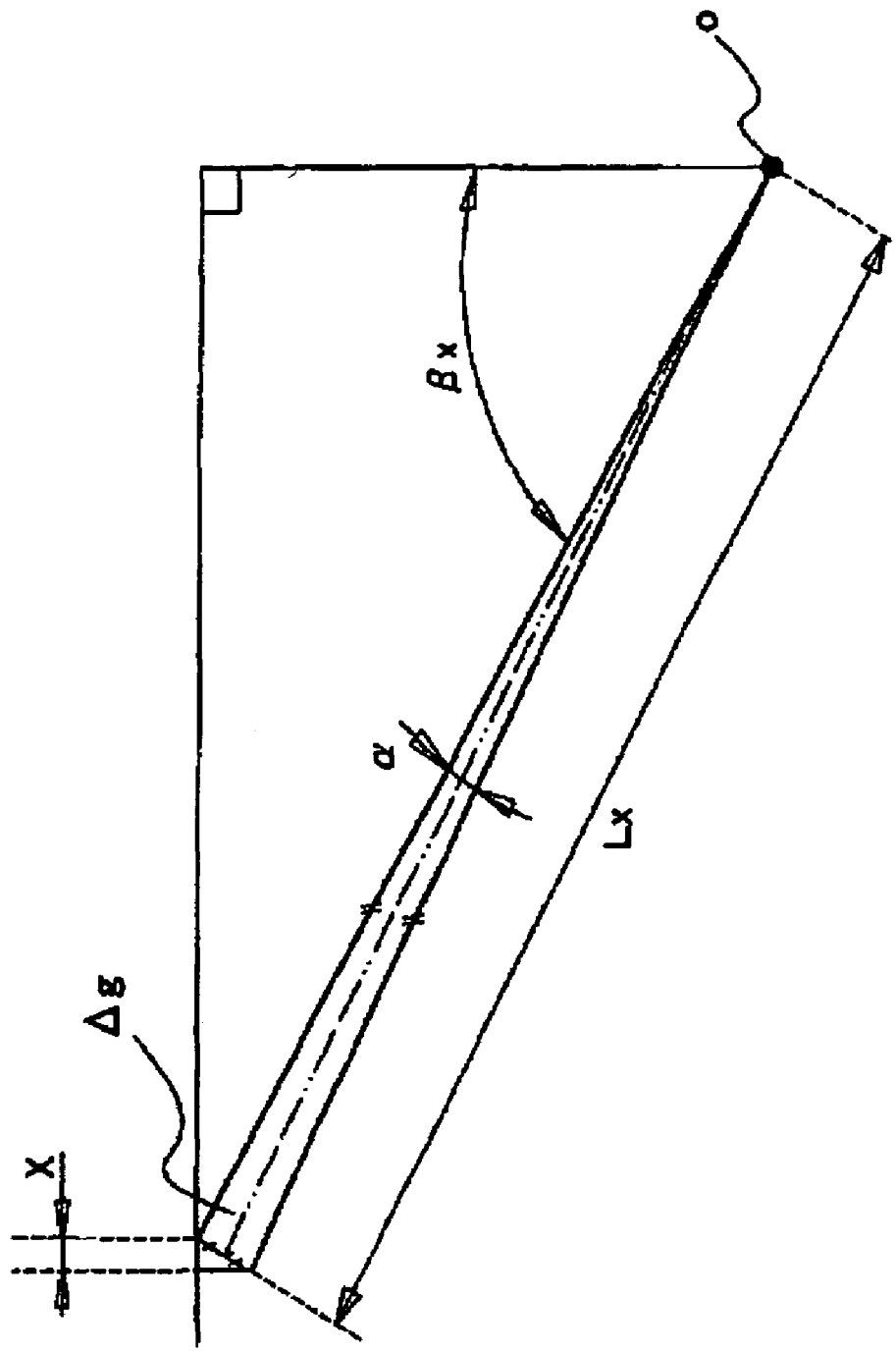
FIG. 7(b) is a schematic diagram useful for calculating the amount of displacement of a blade resulting from a change in the shaft diameter of the rotor shaft in the device in FIG. 2.
Figure 8A:
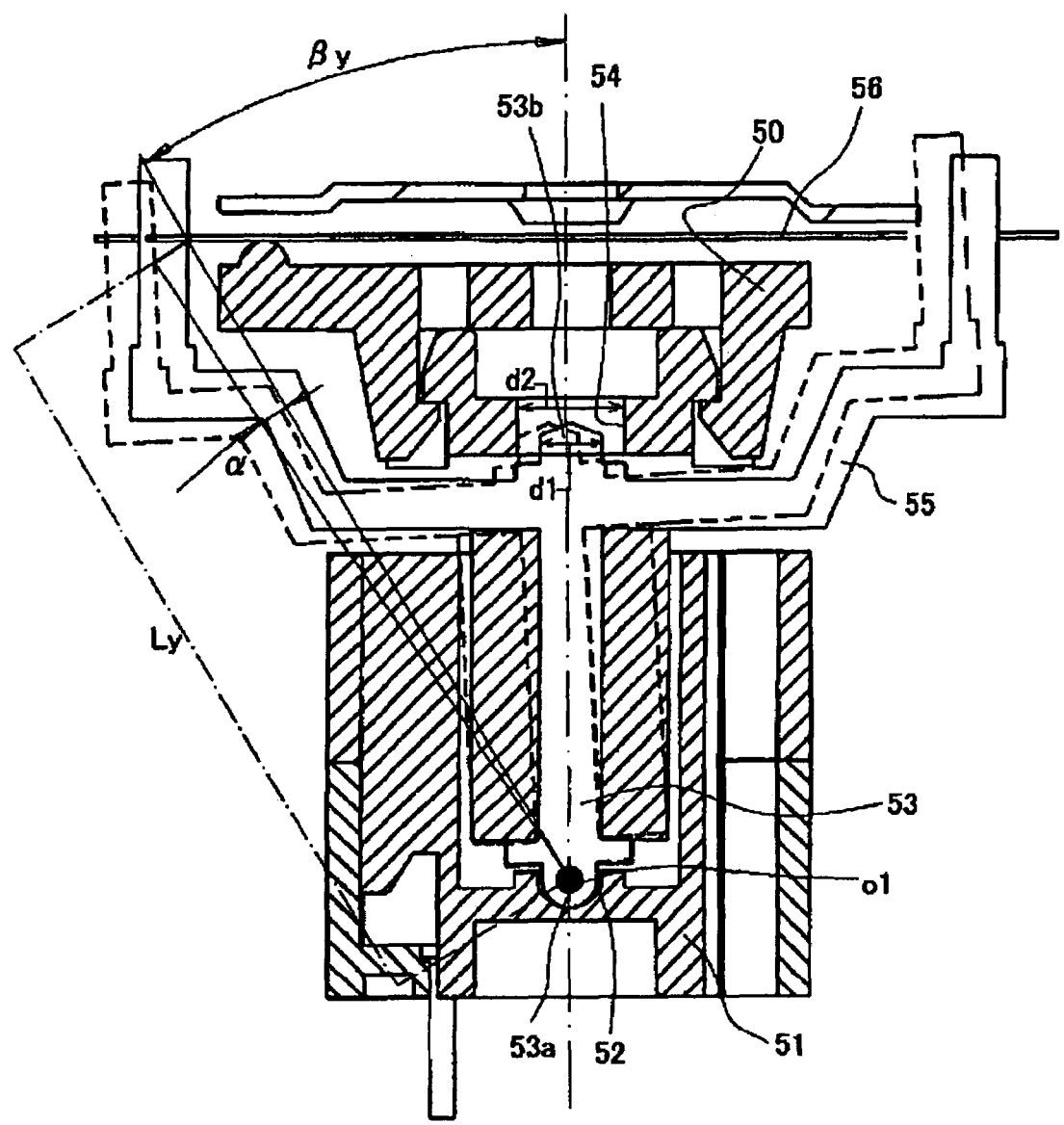
FIG. 8(a) is a diagram illustrating the degree of displacement of a blade resulting from a change in the shaft diameter of a rotor shaft in a conventional device, the rotor shaft being inclined at a predetermined angle.
Figure 8B:
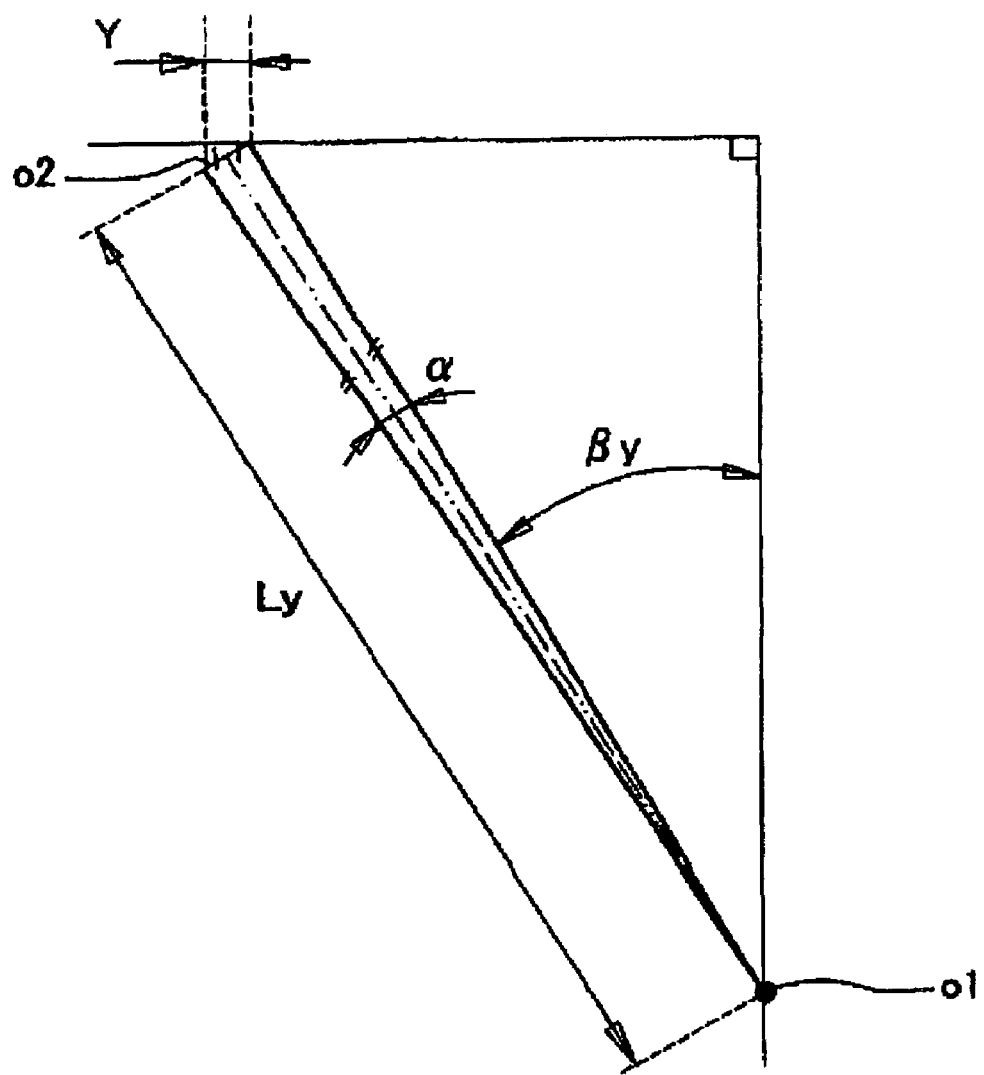
FIG. 8(b) is a schematic diagram useful for calculating the amount of displacement of a blade resulting from a change in the shaft diameter of the rotor shaft in the conventional device.

As shown in FIGS. 7(*a*) and 7(*b*), if an inappropriate machining accuracy or a temporal change during operation results in a gap error $\Delta g$ in connection with the shaft diameter Dr of the rotating shaft (rotor shaft) 32 and the inner diameter De of the bearing recess 35*d*, the rotating shaft 32 (rotor shaft) is tilted around the contact o between the first shaft end 32*a* and the bearing recess 35*d*. At this time, the first and second arms 34*a* and 34*b*, integrated with the rotating shaft 32 (rotor shaft), is tilted through the illustrated angle $\alpha$. In this case, displacement X acting on the blade 2 is expressed by:

$$X = 2Lx \cdot \sin(\alpha/2) \cdot \cos(\beta x + \alpha/2)$$

In the schematic diagram shown in FIG. 7(*b*), the displacement X is determined by drawing a line perpendicular to an angle $\alpha/2$ on an isosceles triangle formed by the inclination $\alpha$ of the first and second arms 34*a* and 34*b*, and determining the length $2Lx \cdot \sin(\alpha/2)$ of a bottom side and thus the length X in the direction of blade movement (horizontal direction).

If the rotor shaft 32 is tilted around the second shaft end 32*b*, that is, the other edge of the rotor shaft 32, the displacement $Y = 2Ly \cdot \sin(\alpha/2) \cdot \cos(\beta y + \alpha/2)$. The different position of the contact o results in a difference in the magnitude of jolt between the displacements X and Y that is twice the difference (Ly-Lx) from the contact (shaft support point) o. The present inventor's calculation indicates that in connection with the difference in the magnitude of jolt, the displacement X decreases to about one-third of the displacement Y. That is, movement of the contact (shaft support point) o results in a significant difference between the displacements X and Y because in the above equation, Lx<Ly, while βx>βy.

Accordingly, even with a substantial variation in the shaft diameter Dr of the rotor shaft 32 caused by inappropriate machining accuracy, the above bearing structure significantly reduces the magnitude of jolt. This allows the rotor to rotate stably even with a slight machining error in the shaft diameter Dr of the rotor shaft 32.

As described above, the present invention uses the configuration described below to drivingly open and close the blade located on the substrate so as to open and close the optical path aperture. One end of the rotor shaft, constituting the driver, is pointed and supported by the conical beating recess in the frame, the rotor shaft is located so that the pointed shaft end is closer to the substrate. The arm is coupled to the blade. The other end of the rotor shaft is formed to be cylindrical and supported by the cylindrical bearing hole in the frame. Consequently, even with a machining dimensional error in the shapes of the rotor shaft and the bearings, the rotor shaft is supported by the frame such as the coil frame so as to be rotatable around the pointed shaft end.

The pointed shaft end is located closer to the substrate that supports the blade. Thus, even if the rotor shaft is tilted by a dimensional error, the arm, fixed to the rotor shaft, is prevented from tilting steeply. This minimizes the possibility of jolting or displacing the blade. That is, even with a machining dimensional error, displacement or jolting occurring in the engaging portion between the arm and the blade can be minimized because the rotor shaft is borne at the pointed shaft end and because the arm, provided at the shaft end, transmits driving to the blade.

Consequently, even if a machining error occurs in the rotor shaft or arm or the rotor shaft or arm is deformed during operation, the blade is prevented from being significantly displaced even with a machining error in the bearing for the rotor shaft. This is because the rotor shaft is positioned on the basis of the pointed shaft end and because the pointed shaft end is set closest to the engaging portion of the blade (in the vicinity of the rear surface of the substrate). This allows the blade to be opened and closed between a preset closed position and a preset open position. Further, possible malfunction that exhibits opening and closing behavior such as hunting is prevented while the aperture is controllably restricted to a predetermined diameter.

The disclosure of Japanese Patent Application No. 2006-174803 filed on Jun. 26, 2006 is incorporated as a reference.

While the invention has been explained with reference to the specific embodiments of the invention, the explanation is illustrative and the invention is limited only by the appended claims.

What is claimed is:

1. A light quantity adjusting device comprising:
a substrate that is substantially flat and comprises an optical path aperture,
a blade mounted on a front surface of the substrate operable to adjust a quantity of light passing through the optical path aperture, and
an electromagnetic driver mounted on a rear surface of the substrate to drivingly open and close the blade, the electromagnetic driver comprising a rotor shaft with a permanent magnet, the rotor shaft including a narrowing first shaft end at one end and a cylindrical second shaft end at the other end; an exciting coil that applies a rotating force to the rotor shaft; an arm coupled to the first shaft end, the arm being coupled to the blade to adjust a quantity of light passing through the optical path aperture; and a frame that rotatably bears the rotor shaft, the frame comprising a conical bearing recess that supports the first shaft end and a cylindrical bearing hole that supports the second shaft end,
wherein the electromagnetic driver is mounted so that the first shaft end of the rotor shaft is located at a rear surface side of the substrate,
the exciting coil is wound around the frame and is configured to apply a rotating force to the permanent magnet,
the frame has a sleeve-like yoke of a soft magnetic substance fitted around an upper half thereof and a tube fitted around a lower half thereof,
the yoke exerts a magnetic attractive force on the rotor shaft to urge the first shaft end toward the bearing recess, and
a magnetic detecting element is supported between the tube and the frame to detect magnetism in the rotor shaft.

2. The light quantity adjusting device according to claim 1, wherein the tube is a heat-shrinkable tube.

3. A light quantity adjusting device comprising:
a substrate that is substantially flat and comprises an optical path aperture,
a blade mounted on a front surface of the substrate operable to adjust a quantity of light passing through the optical path aperture, and
an electromagnetic driver mounted on a rear surface of the substrate to drivingly open and close the blade, the electromagnetic driver comprising a permanent magnet having a cylindrical shape with a predetermined length in an axial direction thereof; a rotor shaft provided at an axis of the permanent magnet; an exciting coil that applies a rotating force to the rotor shaft; a frame for rotatably supporting the rotor shaft; a yoke of a soft magnetic substance fitted around the frame,
wherein the rotor shaft includes a narrowing first shaft end at one end and a cylindrical second shaft end at the other end,
the frame comprises a conical bearing recess that supports the first shaft end and a cylindrical bearing hole that supports the second shaft end,
the first shaft end of the rotor shaft is located at a side of the substrate, and the rotor has an arm integrally connected to the first shaft end to transmit an open and close driving force to the blade,
the yoke has an axial center biased toward the first shaft end by a predetermined distance with respect to an axial center of the permanent magnet,
the first shaft end comprises an outward curved surface,
the bearing recess comprises a curved surface configured to receive the outward curved surface of the first shaft end, and
a radius of curvature of the curved surface of the bearing recess is larger than that of the outward curved surface of the first shaft end.

4. The light quantity adjusting device according to claim 3, wherein the exciting coil is wound around the frame and is configured to apply a rotating force to the permanent magnet,
the frame has a sleeve-like yoke of a soft magnetic substance fitted around an upper half thereof and a tube fitted around a lower half thereof,
the yoke exerts a magnetic attractive force on the rotor shaft to urge the first shaft end toward the bearing recess, and
a magnetic detecting element is supported between the tube and the frame to detect magnetism in the rotor shaft.

5. The light quantity adjusting device according to claim 4, wherein the tube is a heat-shrinkable tube.

* * * * *